United States Patent
Iorio (10) Patent No.: US 9,773,023 B2
(45) Date of Patent: Sep. 26, 2017

(54) IMAGE SELECTION USING AUTOMATICALLY GENERATED SEMANTIC METADATA

(71) Applicant: AUTODESK, INC., San Rafael, CA (US)

(72) Inventor: Francesco Iorio, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 315 days.

(21) Appl. No.: 13/870,864

(22) Filed: Apr. 25, 2013

(65) Prior Publication Data
US 2014/0324823 A1 Oct. 30, 2014

(51) Int. Cl.
*G06F 17/30* (2006.01)
(52) U.S. Cl.
CPC .............................. *G06F 17/30268* (2013.01)
(58) Field of Classification Search
CPC ...................... G06F 17/30247; G06F 17/30828
USPC ......... 707/722, 706, 769, E17.002, E17.014, 707/736, 741, E17.005, E17.03, E17.108, 707/710, 711, 723, 728, 755, 758, 767, 707/771; 705/14.53, 14.54, 14.55, 319, 705/44, 7.19, 14.23, 14.44, 14.73, 21, 705/26.5, 26.61, 26.7, 27.1, 27.2, 347, 39, 705/76; 709/204, 218, 205, 224
See application file for complete search history.

(56) References Cited

U.S. PATENT DOCUMENTS

| | | | | |
|---|---|---|---|---|
| 6,463,426 B1* | 10/2002 | Lipson | .............. | G06F 17/30247 |
| 8,489,627 B1* | 7/2013 | Brandt | .......................... | 707/765 |
| 2006/0112092 A1* | 5/2006 | Ziou | ................. | G06F 17/30274 |
| 2006/0251292 A1* | 11/2006 | Gokturk et al. | .............. | 382/103 |
| 2010/0115036 A1* | 5/2010 | Rosner | .............. | G06F 17/30058 |
| | | | | 709/206 |
| 2010/0306193 A1* | 12/2010 | Pereira | .............. | G06F 17/30784 |
| | | | | 707/728 |
| 2011/0246466 A1* | 10/2011 | Ekin | ................. | G06F 17/30277 |
| | | | | 707/737 |
| 2014/0172892 A1* | 6/2014 | Schechter et al. | ............ | 707/758 |

* cited by examiner

*Primary Examiner* — Jay Morrison
*Assistant Examiner* — Ken Hoang
(74) *Attorney, Agent, or Firm* — Artegis Law Group, LLP (57) ABSTRACT

A computer-implemented method for method for selecting visual subject matter stored in a database includes receiving user input that indicates a first region of a first image that is stored in the database and, based on metadata associated with the first image stored in the database, determining at least one visual feature in the first region of the first image stored in the database. The method further includes, based on metadata associated with other images stored in the database, selecting a second image from the database that includes a visual feature that correlates with the visual feature in the first region of the first image, wherein the metadata associated with the first image stored in the database and the metadata associated with the other images stored in the database include image correlation information received from a remote server device.

21 Claims, 8 Drawing Sheets

IMAGE SELECTION USING AUTOMATICALLY GENERATED SEMANTIC METADATA

BACKGROUND OF THE INVENTION

Field of the Invention

The present invention relates generally to browsing through collections of visual subject matter and, more specifically, to image selection using automatically generated semantic metadata.

Description of the Related Art

The ever-increasing use of digital imaging has made the storage and dissemination of visual subject matter, such as images and videos, very convenient for the average user. However, searching through large-scale digital collections for a particular image or video can be time-consuming, inconvenient, or both. This is because visual subject matter that has not been tagged in some way with easily remembered metadata can generally only be found by browsing through a very large number of images, even when filtering algorithms are used to narrow the search. Typically, automatically assigned metadata, such as the date and time that the desired image or video was created, are rarely useful in facilitating a user's search. Similarly, metadata tags that are manually assigned to individual images and videos by a user have limited value, such as subject matter categories, descriptions, and/or titles, since efficient searching requires a user to remember what tag or tags were assigned to a desired image long after the image was originally downloaded or created. For a collection of visual subject matter that includes hundreds of videos and images that may be organized into dozens of manually assigned categories, relying on user memory as the primary instrument for finding a particular item is unrealistic and unreliable.

As the foregoing illustrates, there is a need in the art for a more effective way to search for visual subject matter stored in a database.

SUMMARY OF THE INVENTION

One embodiment of the present invention sets forth a computer-implemented method for selecting visual subject matter stored in a database. The method includes receiving user input that indicates a first region of a first image that is stored in the database and, based on metadata associated with the first image stored in the database, determining at least one visual feature in the first region of the first image stored in the database. The method further includes, based on metadata associated with other images stored in the database, selecting a second image from the database that includes a visual feature that correlates with the visual feature in the first region of the first image, wherein the metadata associated with the first image stored in the database and the metadata associated with the other images stored in the database include image correlation information received from a remote server device.

One advantage of the disclosed technique is that it enables fast and accurate location of a desired item in a collection of visual subject matter stored in a database, such as an image or video. Because browsing for the desired item is based on visual features selected by a user, the user is not required to remember metadata associated with the item in order to efficiently locate the item.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

In the following description, numerous specific details are set forth to provide a more thorough understanding of the present invention. However, it will be apparent to one of skill in the art that the present invention may be practiced without one or more of these specific details.

Figure 1:
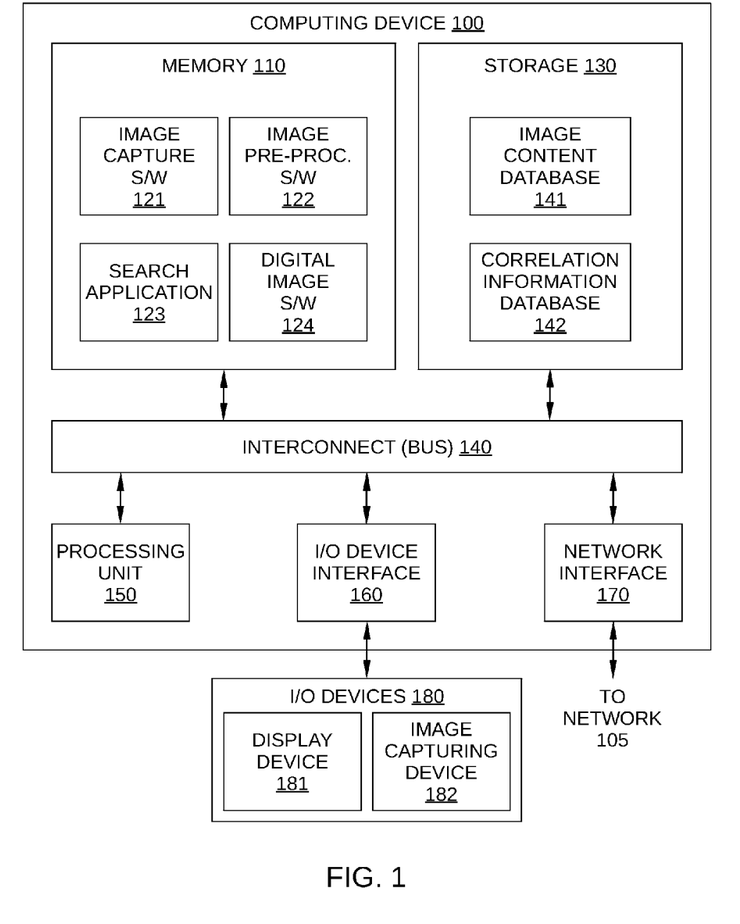
FIG. 1 illustrates a computing device configured to implement one or more aspects of the present invention.

FIG. 1 illustrates a computing device 100 configured to implement one or more aspects of the present invention. Computing device 100 may be a desktop computer, a laptop computer, a smart phone, a personal digital assistant (PDA), video game console, set top console, tablet computer, or any other type of computing device configured to receive input, process data, and display images, and is suitable for practicing one or more embodiments of the present invention. Computing device 100 is configured to run image capture software 121, image preprocessing software 122, a search application 123, and digital image software 124, which all reside in a memory 110. Image capture software 121, image preprocessing software 122, search application 123, digital image software 124, and memory 110 are described in detail below. Computing device 100 is further configured to display graphical images and/or videos to the end-user via input/output (I/O) devices 180 (described below). It is noted that the computing device described herein is illustrative and that any other technically feasible configurations fall within the scope of the present invention.

As shown, computing device 100 includes an interconnect (bus) 140 that connects a processing unit 150, an input/output (I/O) device interface 160 coupled to input/output (I/O) devices 180, memory 110, a storage 130, and a network interface 170. Processing unit 150 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 150 may be any technically feasible hardware unit capable of processing data and/or executing software applications, including image capture software 121, image preprocessing software 122, search application 123, and digital image software 124. Further, in the context of this disclosure, the computing elements shown in computing device 100 may correspond to a physical computing system (e.g., a system in a data center) or may be a virtual computing instance executing within a computing cloud.

I/O devices 180 may include devices capable of providing input, such as a keyboard, a mouse, an image capturing device 182, a three-dimensional (3D) scanner, and so forth, as well as devices capable of providing output, such as a display device 181, a speaker, and so forth. Display device 181 may be a computer monitor, a video display screen, a display apparatus incorporated into a hand held device, or any other technically feasible display screen configured to present video media to an end-user. In some embodiments, display device 181 is a terminal window displayed on another display device, such as a video display window that has been opened by digital image software 124. Image capturing device 182 may be a digital camera, a digital video camera, and the like. Additionally, I/O devices 180 may include devices capable of both receiving input and providing output, such as a touchscreen, a universal serial bus (USB) port, and so forth. I/O devices 180 may be configured to receive various types of input from an end-user of computing device 100, and to also provide various types of output to the end-user of computing device 100, such as displayed digital images or digital videos. In some embodiments, one or more of I/O devices 180 are configured to couple computing device 100 to a network 105.

Network 105 may be any technically feasible type of communications network that allows data to be exchanged between computing device 100 and external entities or devices, such as a web server system 400 (described below in conjunction with FIG. 4). For example, network 105 may include a wide area network (WAN), a local area network (LAN), a wireless (WiFi) network, and/or the Internet, among others.

Memory 110 may include a random access memory (RAM) module, a flash memory unit, or any other type of memory unit or combination thereof. Processing unit 150, I/O device interface 160, and network interface 170 are configured to read data from and write data to memory 110. Memory 110 includes various software programs that can be executed by processor 150 and application data associated with said software programs, including image capture software 121, image preprocessing software 122, search application 123, and digital image software 124.

Image capture software 121 may include any technically feasible software application configured to capture digital images and/or digital videos, via image capturing device 182 or any other of I/O devices 180. Image preprocessing software 122 is configured to perform pre-processing operations on images stored in an image content database 141, such as coarse feature extraction, image extraction, and the like. For example, in some embodiments, image preprocessing software 122 is configured to perform image segmentation, which is the process of partitioning an image into coherent parts that share certain common properties and therefore have some level of homogeneity, such as spectral (color), geometrical (shape), pattern frequency, or other properties. Search application 123 is a computer application configured to facilitate selecting visual subject matter stored in a local database, such as image content database 141, and is described in greater detail below. Digital image software 124 may be any computer application or playback engine configured to play video content or display digital images for an end-user on display device 181.

Storage 130 may be any technically feasible persistent storage device, such as a disk drive storage device, a solid-state storage device, or a combination of both. Although shown as a single unit, storage 130 may be a combination of fixed and/or removable storage devices, such as fixed disc drives, removable memory cards, or optical storage, network attached storage (NAS), or a storage area-network (SAN). In some embodiments, storage 130 includes an image content database 141 and a correlation information database 142.

Image content database 141 includes digital images and/or digital videos that together make up a collection of visual subject matter stored on computing device 100 by one or more end-users. With the storage capacity of mobile computing devices extending into the gigabyte regime, image content database 141 can typically be quite large, even when computing device 100 is a hand-held mobile device, such as a smart phone. According to embodiments of the present invention, search application 123, used in conjunction with correlation information database 142, can greatly facilitate the otherwise time-consuming process of scrolling through very large numbers of individual digital images and video thumbnails to find a desired item in image content database 141. Search application 123 and correlation information database 142 are described below.

Correlation information database 142 includes metadata associated with the various items of visual subject matter that are stored in image content database 141, e.g., digital images and/or digital videos. The metadata stored in correlation information database 142 generally includes semantic correlation information, such as word-based descriptions of visual features that have been identified in a particular item stored in image content database 141, e.g., "tree," "lake," "face," "flower," "car," etc. In addition, correlation information database 142 may include categories of subject matter included in the items stored in image content database 141, e.g., "night," "day," "persons," "pets," and the like. Furthermore, in some embodiments, some categories of subject matter may reference spatial positioning of one or more visual features, such as "boat on water," or "persons in background," etc. It is noted that any particular image or video may have multiple categories associated therewith. In some embodiments, the identification of such visual features and/or categories is performed procedurally, i.e., algorithmically with a computer, rather than manually by a user.

Feature detection algorithms, image processing applications, and the extensive database searches associated with procedural semantic correlation processes typically involve significant computational complexity. Consequently, semantic correlation processes are best implemented with extensive parallel processing resources generally not available in either personal computers or mobile devices. Furthermore, accurate semantic correlation between detected visual features in a particular image with example visual features stored in a repository or database generally requires a large number of example visual features, e.g., thousands or millions. Thus, accurate semantic correlation is facilitated by using more data storage than is readily available in many computing devices. Consequently, some or all of the semantic correlation information in correlation information database 142 is not generated locally by computing device 100. Instead, the feature detection and semantic correlation used for generating such semantic correlation information is performed by a device or system external to computing device 100, such as a server system 400, described below in conjunction with FIG. 4.

In some embodiments, the metadata stored in correlation information database 142 may also include semantic correlation information or other metadata that are manually assigned to particular items stored in image content database 141. For example, in some embodiments, correlation information database 142 includes category descriptions and/or subject matter descriptions for some items stored in image content database 141. In some embodiments, such category and/or subject matter descriptions are assigned by the user of computing device 100, and in other embodiments, such category and/or subject matter descriptions are assigned by the creator of the item in image content database 141 associated with the description. In addition, the metadata stored in correlation information database 142 may include metadata that are automatically generated and assigned to an item in image content database 141 by the device that generated the item. For example, when a digital image is captured by one of I/O devices 180 of computing device 100, computing device 100 may assign to the digital image such automatically generated metadata as the time of creation of the image, an identification number of the device used to capture the digital image, a GPS location of the capturing device at time of capture, user identification information, and the like.

In operation, computing device 100 facilitates a user search to find a desired item in image content database 141 by displaying images that share one or more features with the desired item. Specifically, search application 123 selects images and/or video thumbnails from image content database 141 based on user input indicating a region of one of the images or video thumbnails stored in image content database 141. First, search application 123 determines what visual feature or features are included in the region indicated by the user. Next, based on semantic correlation data associated with this feature or features, search application 123 searches correlation information database 142 for semantic correlation information that corresponds with or is related to the semantic correlation data associated with the visual feature or features. Search application 123 selects images from image content database 141 that include visual features or other correlation information having the highest correlation to the feature or features indicated by the user. Search application 123 then causes the selected images to be displayed on display device 181 for browsing by the user. Thus, search application 123 narrows a search for a desired image by only showing images from the very large number of individual digital images and videos available that are closely related to or include one or more visual features indicated by the user.

A visual feature on an image that is shared by the desired item may be indicated by the user with a gesture on a touch-sensitive screen of computing device 100, such as a tap, a selection box, or a drawn circle. Alternatively, such a feature may be indicated by the user with a selection on a conventional display device, such as a cursor drag selection box or mouse click on a display screen of computing device 100. Thus, rather than a menu-based search application, in which search parameters and filtering values are entered using a menu- or text-based approach, search application 123 includes a selection-based or gesture-based feature selection algorithm that includes the use of spatially sensitive tags. Furthermore, the selection criteria are based on visual features selected by the user that the user remembers to be present in the desired item. Consequently, a user does not need to actively remember specific tags, categories or other metadata associated with the desired item in order to efficiently filter the large number of items in image content database 141 down to a manageable number for browsing.

Because a single visual feature in an image, e.g., a face, a person, a tree, the sky, etc., generally correlates to a large number of other images or videos stored in image content database 141, in some embodiments, search application 123 is configured to provide dynamic filtering during a user search for a desired item. In particular, when searching through the many items of visual content in image content database 141, a user can continue to select additional features to be used as positive or negative selection criteria for search application 123. As more search criteria are added by the user in this way, search application 123 can quickly reduce the number of images and videos being displayed and through which the user must browse to find the desired item. Because visual features are indicated by the user via a simple gesture-based or selection-based approach, the filtering process does not require the user to browse through large numbers of items and consequently proceeds very quickly. Various embodiments of such dynamic filtering are illustrated in FIGS. 2A-2D.

FIGS. 2A-2D illustrate a graphical user interface (GUI) 200 of search application 123 during a dynamic filtering process, according to various embodiments of the present invention. GUI 200 is displayed on display device 181 of computing device 100, and includes multiple browsing images 210 that each correspond to an item, e.g., an image or video, stored in image content database 141. Browsing images 210 may be full-resolution images or reduced-resolution images that each represent a full-resolution item stored in image content database 141. When searching for a particular item in image content database 141, a user can browse through browsing images 210 using any technically feasible means, including swiping a touch-sensitive screen, rotating a scroll wheel on a mouse, dragging a scroll indicator 202, etc.

Figure 2A:
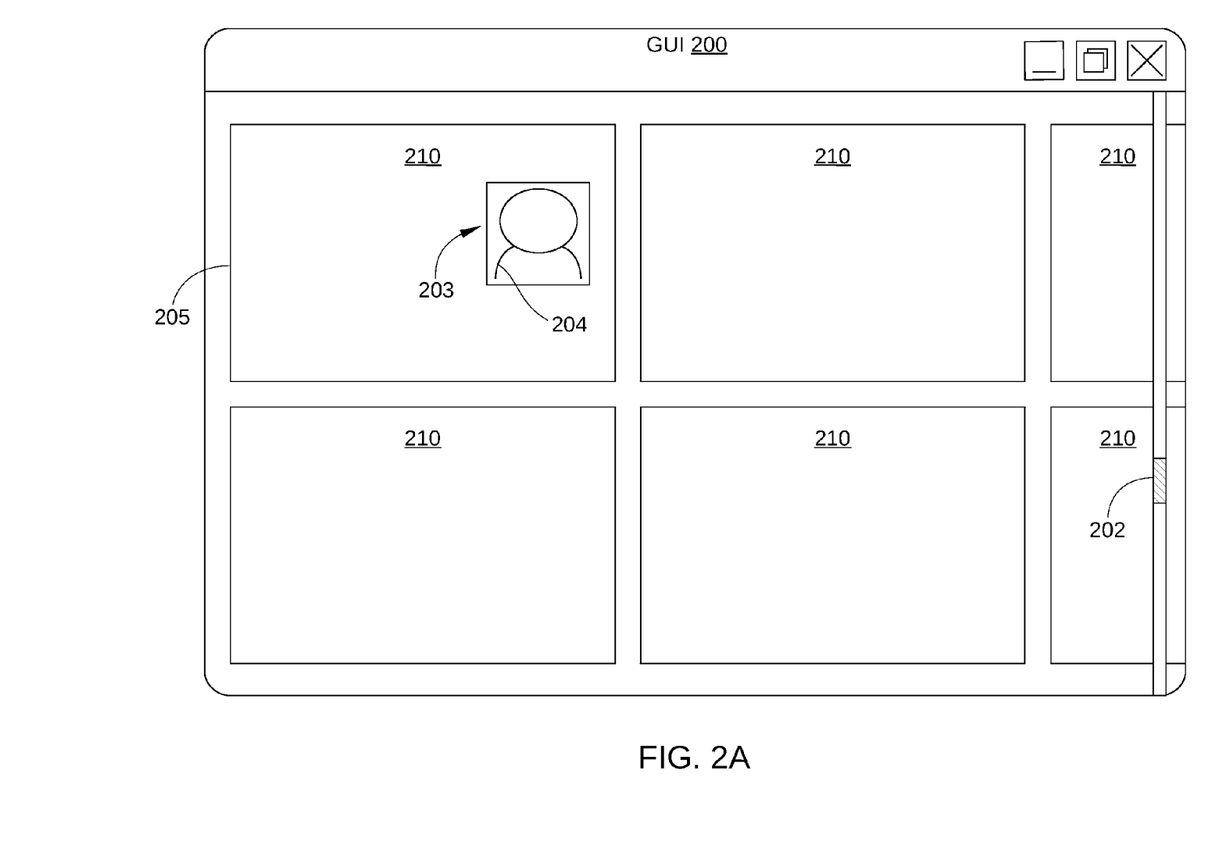
FIGS. 2A-2D illustrate a graphical user interface of a search application during a dynamic filtering process, according to various embodiments of the present invention.
Figure 2B:
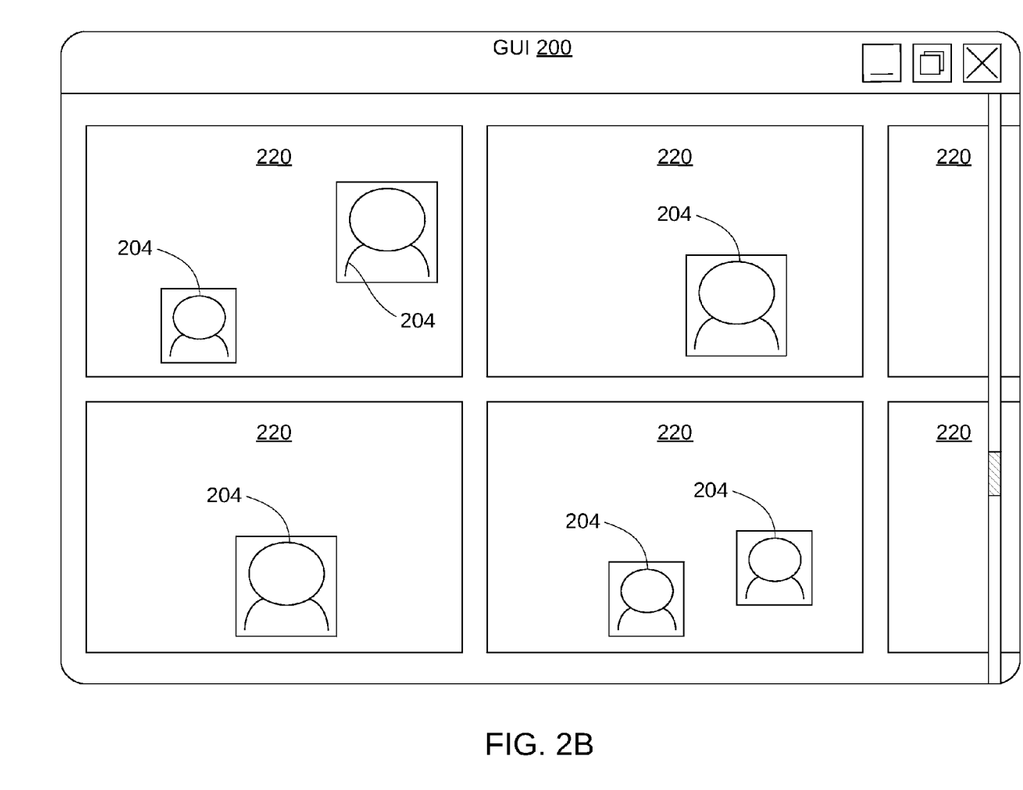

In FIG. 2A, a user has selected a region 203 of browsing image 210 with, for example, a gesture on a touch-sensitive screen, a selection with a mouse, etc. Thus, region 203 is highlighted. In FIG. 2B, searching application 123 updates GUI 200 to display browsing images 220 that represent images or videos stored in image content database 141 that correlate in some way to region 203 highlighted in FIG. 2A. For example, one or more visual features 204 in region 203 is present in each of browsing images 220 and highlighted accordingly. In the embodiment illustrated in FIG. 2B, browsing images 220 are displayed in full and the actual position of visual feature 204 is shown. In other embodiments, the view of each of browsing images 220 in GUI 200 is centered and zoomed onto visual feature 204 to facilitate recognition by the user during scrolling. In still other embodiments, a morphing function may be used while scrolling between browsing images 220 that is centered on visual feature 204 in each browsing image 220.

Figure 2C:
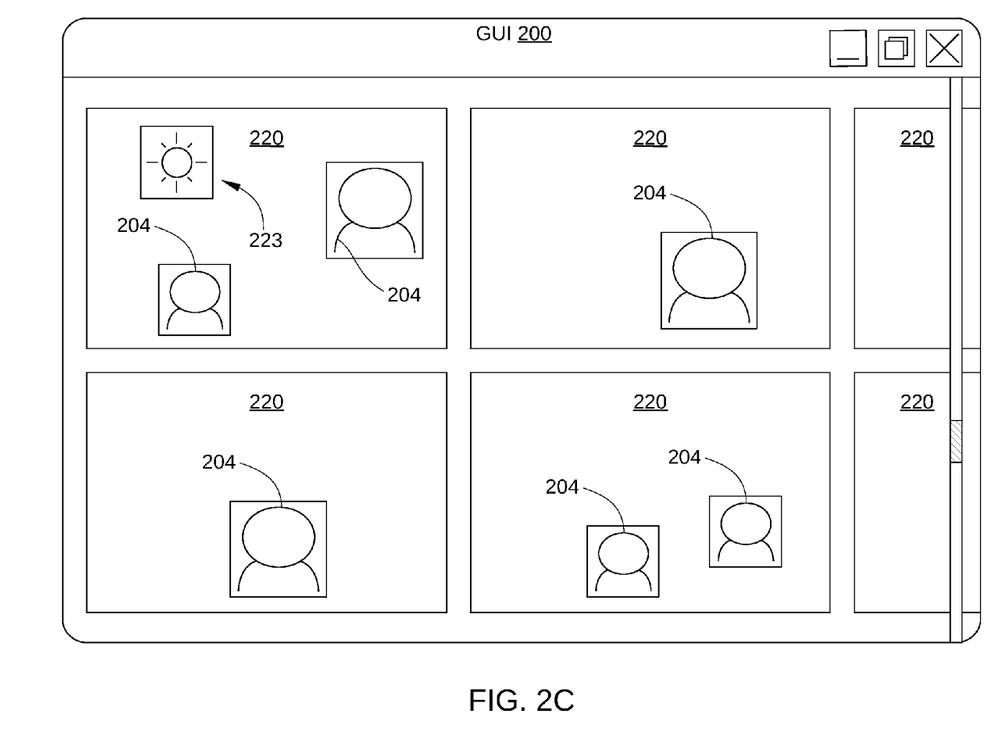
Figure 2D:
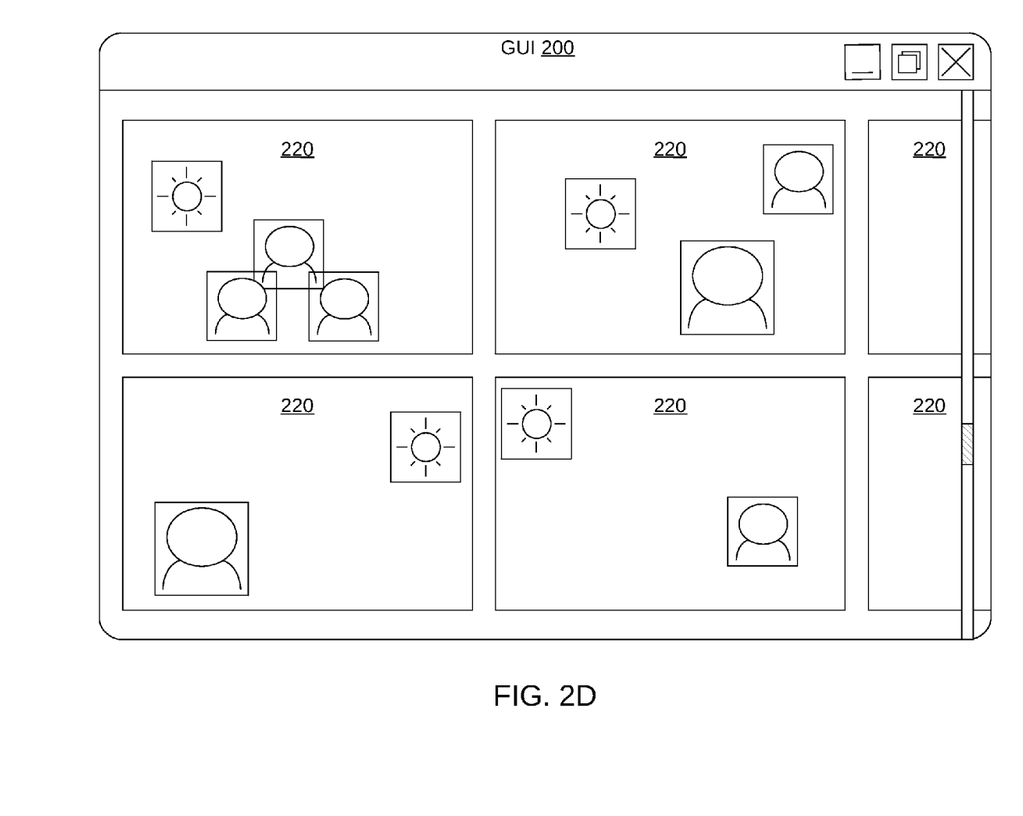

In FIG. 2C, after a user has determined that additional search criteria will facilitate the searching process, the user highlights a second region 223 in one of browsing images 220. In FIG. 2D, searching application 123 updates GUI 200 to display browsing images 230 that represent images or videos stored in image content database 141 that correlate in some way with region 203 highlighted in FIG. 2A and with second region 223 in FIG. 2C. In this way, a user can continue to quickly provide additional search criteria based on visual features rather than text-based or menu-based filtering inputs.

Figure 3:
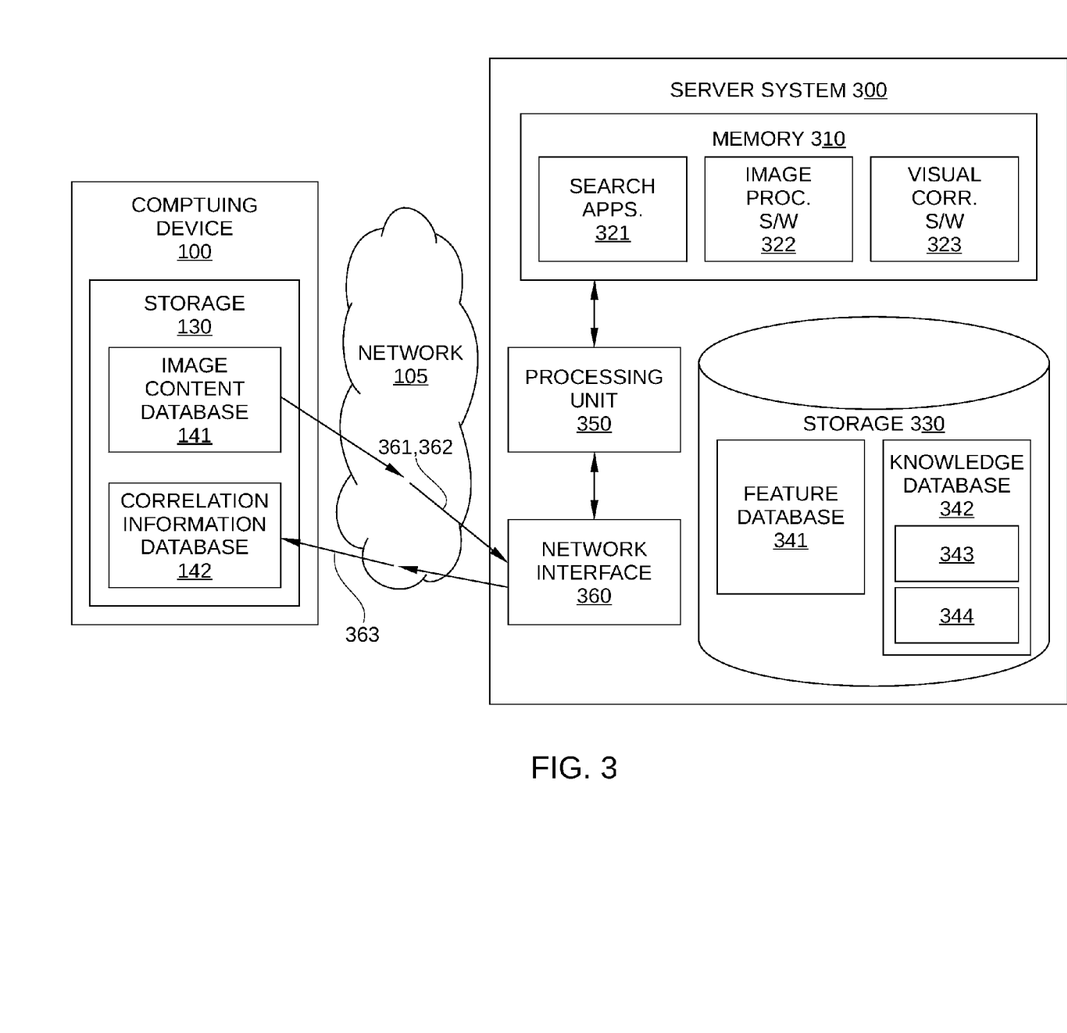
FIG. 3 is a block diagram of the computing device of FIG. 1 and a server system configured to implement one or more aspects of the present invention.

FIG. 3 is a block diagram of computing device 100 of FIG. 1 and a server system 300 configured to implement one or more aspects of the present invention. In operation, server system 300 interacts with computing device 100 via network 105 as shown, and is configured to generate metadata for user content stored in image content database 141. As shown, server system 300 includes a memory 310, a storage 330, a processing unit 350, and a network interface 370.

Memory 310 may include a single or a plurality of RAM modules, flash memory units, or any other type of memory unit or combination thereof. Because server system 300 may be configured to generate metadata for a large number of different computing devices and/or users simultaneously, memory 310 may be much larger than memory 110 of computing device 100. Memory 310 includes various software programs that can be executed by processor 350 and application data associated with said software programs, including one or more search applications 321, image processing software 322, and visual correlation software 323, each of which is described below.

Search applications 321 may include any technically feasible search engines or algorithms configured to facilitate collection of digital images and associated metadata via network 105. Digital images collected by search applications 321 are processed by image processing software 322, and metadata associated with the collected digital images are stored in knowledge database 342. Image processing software 322 is configured to generate features and associated metadata that are stored in features database 341, and may include one or more computer vision applications that perform pattern recognition, feature extraction, and other image processing procedures. Visual correlation software 323 may include one or more computer vision applications configured to perform pattern and object recognition and image semantic analysis of visual features extracted by image processing software 322. Computer vision, i.e., acquiring, processing, analyzing, and understanding images in order to produce numerical or symbolic information, is a field well-known in the art, and various software applications and programming techniques are known that can be used for image processing software 322 and visual correlation software 323.

Processing unit 350 may be any suitable processor or parallel processing system implemented as one or more CPUs, GPUs, any other type of processing unit, or a combination of different processing units, such as a CPU configured to operate in conjunction with a GPU. For example, in order to provide suitable computing resources for simultaneously generating metadata for images associated with a large number of different computing devices or users, e.g., hundreds or thousands, processing unit 350 may be configured as one or more chip multiprocessors, systems-on-a-chip, etc., and capable of highly parallel processing. Processing unit 350 is configured to read data from and write data to memory 310 and to access network 105 via network interface 360. Furthermore, processing unit 350 is configured for processing data and/or executing software applications, including search applications 321, image processing software 322, and visual correlation software 323.

Storage 330 may be any technically feasible persistent storage, such as a disk drive storage device, a solid-state storage device, or a combination of both. Although shown as a single unit, storage 330 may be a combination of fixed and/or removable storage devices, such as fixed disc drives, removable memory cards, or optical storage, network attached storage (NAS), or a storage area-network (SAN). In some embodiments, storage 330 includes a feature database 341 and a knowledge database 342.

Feature database 341 includes individual visual features extracted from digital images that are selected by search applications 321. The extraction of visual features from such digital images is generally the result of image segmentation performed by image processing software 322. A larger number of visual features residing in feature database 341 greatly improves accuracy of image semantic analysis performed by visual correlation software 323. Thus, in some embodiments, feature database 341 includes thousands or millions of individual features, each associated with metadata stored in knowledge database 342.

To better facilitate the semantic correlation performed by visual correlation software 323, the individual visual features stored in feature database 341 may be "heavily tagged" features. That is, some or all of the visual features stored in feature database 341 have a plurality of semantic correlation information 343 and other metadata associated therewith, the semantic correlation information 343 and other metadata being stored in knowledge database 342. For example, a particular visual feature extracted from an image selected by search application 321 may be associated with semantic correlation information providing not only a general word-based description of the visual feature, e.g., "tree," "lake," "face," "flower," "car," but also subject matter categories, positional information indicating in what part of the original image the visual feature is located, lighting conditions, other visual features extracted from the same original image, etc. In some embodiments, some of the semantic correlation information associated with a particular feature that is stored in feature database 341 may include word-based descriptions of the original image from which the feature was extracted, such as an image title or text related to the original image. For example, such word-based descriptions may be drawn from a web site that contains the original image.

Knowledge database 342 includes the afore-mentioned semantic correlation information 343 for the visual features stored in feature database 341, including procedurally generated semantic correlation information and manually applied semantic correlation information. In addition, knowledge database 342 may also include other correlation information associated with some or all of the visual features stored in feature database 341, such as spectral information of visual features, textural information, visual feature size, feature orientation in the originating image, correlation weighting factors associated with such information, and any other information that can facilitate the semantic correlation performed by visual correlation software 323.

In some embodiments, knowledge database 342 may further include user image semantic correlation information 344. User image semantic correlation information 344 includes semantic information, correlation values, and other metadata generated for one or more user images and/or videos associated with an individual user or computing device, such as computing device 100. In some embodiment user image semantic correlation information 344 is archived and can be accessed by a particular user or computing device. In other embodiments, user image semantic correlation information 344 is temporarily stored in knowledge database, for example during the process of server system 300 performing semantic correlation of image content for a particular user.

It is noted that while server system 300 is illustrated in FIG. 3 as a single physical entity, such as a physical computing system in a data center, in the context of this disclosure, the various elements of server system 300 may be a virtual computing instance executing within a computing cloud.

In operation, server system 300 receives image content 361 from computing device 100 via network 105. Image content 361 may include digital images and representative images for videos that are stored in computing device 100. Image content 361 may include full-resolution image and/or video files or reduced resolution image and/or video files. In some embodiments, server system 300 may also receive metadata 362 from computing device. Generally, metadata 362 is relatively limited, and may include automatically generated metadata, such as time of file creation, and manually assigned semantic tags, such as titles and subject matter categories assigned by a user of computing device 100. In some embodiments, metadata 362 may include metadata generated by image pre-processing software 122 of computing device 100. In such embodiments, metadata 362 may include data generated by an image segmentation process.

Upon receiving image content 361, and in some embodiments metadata 362, server system 300 extracts individual visual features from a particular image in image content 361 and generates associated metadata using image processing software 342. Visual correlation software 323 performs the semantic analysis to generate semantic correlation data 363 for the image of interest. Semantic correlation data 363 is then transmitted to computing device 100 via network 105 for storage in correlation information database 142. In some embodiments, the extracted visual features may be stored in user image semantic correlation information 344 for future semantic analysis when additional image content 361 is received from computing device 100.

In some embodiments, semantic correlation data 363 includes correlation data configured to provide correlated relationships between the various items stored in image content database 141 of computing device 100. These correlated relationships established between each item stored in image content database 141 can be based on shared visual features, subject matter categories, and the like. Server system 300 can develop semantic correlation data 363 for a particular image based on the large number of visual features available in features database 341 and on semantic correlation information 343 and other metadata being stored in knowledge database 342. Consequently, semantic correlation data 363 can include more extensive and more accurate semantic tags and categories than when semantic analysis is performed locally by computing device 100 on stored images.

Figure 4:
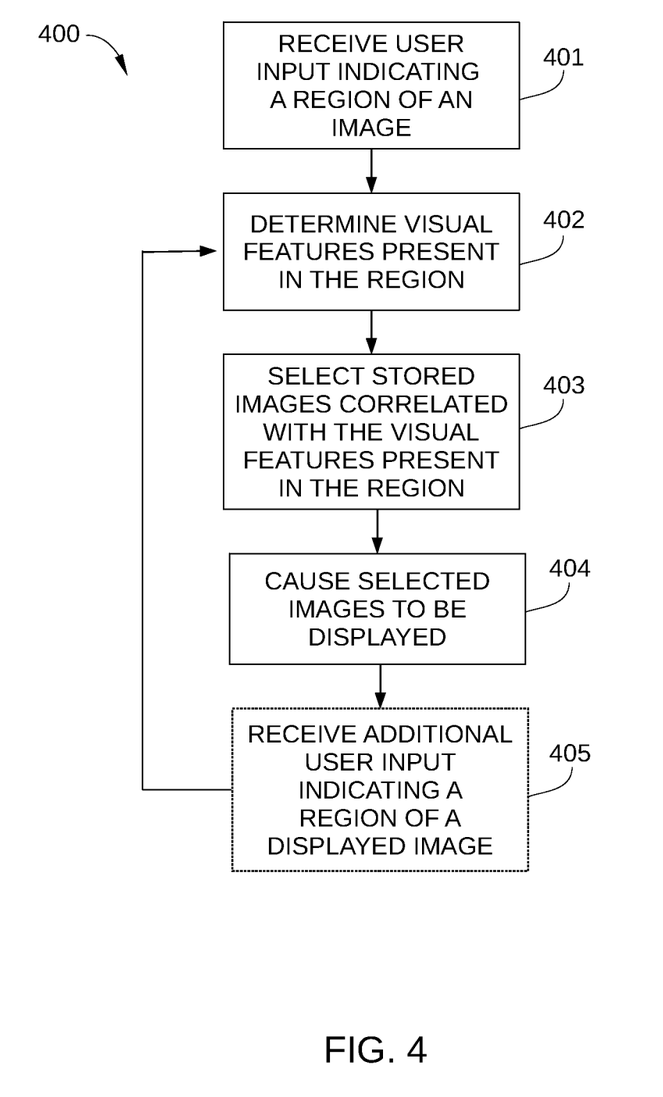
FIG. 4 is a flowchart of method steps for selecting visual subject matter stored in a database, according to one embodiment of the present invention.

FIG. 4 is a flowchart of method steps for selecting visual subject matter stored in a database, according to one embodiment of the present invention. Although the method steps are described in conjunction with the systems of FIGS. 1-2D, persons skilled in the art will understand that any system configured to perform the method steps, in any order, is within the scope of the present invention.

Prior to beginning a method 400, a plurality of digital images and/or videos are stored by a user locally in a computing device, such as in image content database 141. In addition, semantic correlation information is stored locally in the computing device, for example in correlation information database 142. The stored semantic correlation information includes word-based descriptions of visual features as well as other metadata associated with the digital images and/or digital videos that are stored in image content database 141. This semantic correlation information provides correlations between digital images and/or digital videos stored in image content database 141 that share one or more of the same visual features, are in some way related to each other, or include visual features that are in some way related to each other. In some embodiments, such semantic correlation information is generated by a remote image processing system, such as server system 300 in FIG. 3. Because server system 300 can perform computationally intensive semantic correlation analysis of the items stored in image content database 141, and can perform such analysis with respect to a very large number of pre-tagged, pre-correlated visual features taken from thousands or millions of other images, the semantic correlation information generated by server system 300 and stored in correlation information database 142 facilitates much more accurate and extensive correlations between items stored in image content database 141.

As shown, the method 400 begins at step 401, where search application 123 receives user input that indicates a region of an image that is stored in the database. The user input may include information generated by a gesture on a touch-sensitive screen or a selection on a display device using a mouse or other pointing device. Thus, when a user searches through the images and/or videos stored in image content database 141 for a desired item, the user can reduce the number of images and videos displayed on display device 181 by indicating a region on one of the currently displayed images or video thumbnails. The user selects the indicated region because the region includes one or more visual features that are in some way similar to one or more visual features present in the desired item being searched for in image content database 141.

In step 402, searching application 123 determines one or more visual features present in the region of a displayed image that is indicated by the user input that has just been received. In some embodiments, the one or more visual features are determined based on image correlation data and/or other metadata associated with the displayed image. For example, for a particular image on which a user indicates a region containing a visual feature, searching application 123 fetches image correlation data and other metadata associated with the image from correlation information database 142. Based on the region of the image indicated by the user and on the fetched image correlation data and/or other metadata associated with the image, searching application 123 can determine one or more visual features in the indicated region.

In step 403, searching application 123 selects images stored in image content database 141 that are correlated with the one or more visual features determined in step 402. The images selected by searching application 123 may include one or more visual features that are similar to the one or more visual features determined in step 402. Alternatively, the images selected by searching application 123 may share one or more category tags or be related in one or more other ways to the one or more visual features determined in step 402.

In step 404, searching application 123 causes the images selected in step 403 to be displayed on display device 181. In some embodiments, searching application 123 causes the selected images to be displayed in descending order of correlation to the image that includes the one or more visual features present in the indicated region. In this way, a user can first scroll through the images that have the highest correlation to the one or more visual features in the indicated region.

In optional step 405, searching application 123 receives additional user input that indicates a region of one of the images displayed in step 404. Optional step 405 may occur when the user indicates another region on one of the images displayed in step 404, for example when a very large number of images and/or videos stored in image content database 141 are determined by searching application 123 to be correlated to the one or more visual features in the region indicated in step 401. When searching application 123 receives the additional input, method 400 proceeds back to step 402.

It is noted that visual features selected in step 401 and optional step 405 may be indicated by the user as either a positive selection criterion or a negative selection criterion. Thus, when a particular visual feature or features are selected as positive selection criteria, searching application 123 searches for images in image content database 141 that share or are correlated in some way with the selected feature or features. Conversely, when a particular visual feature or features are selected as negative selection criteria, searching application 123 searches for images in image content database 141 that do not share or have no correlation with the selected feature or features.

Figure 5:
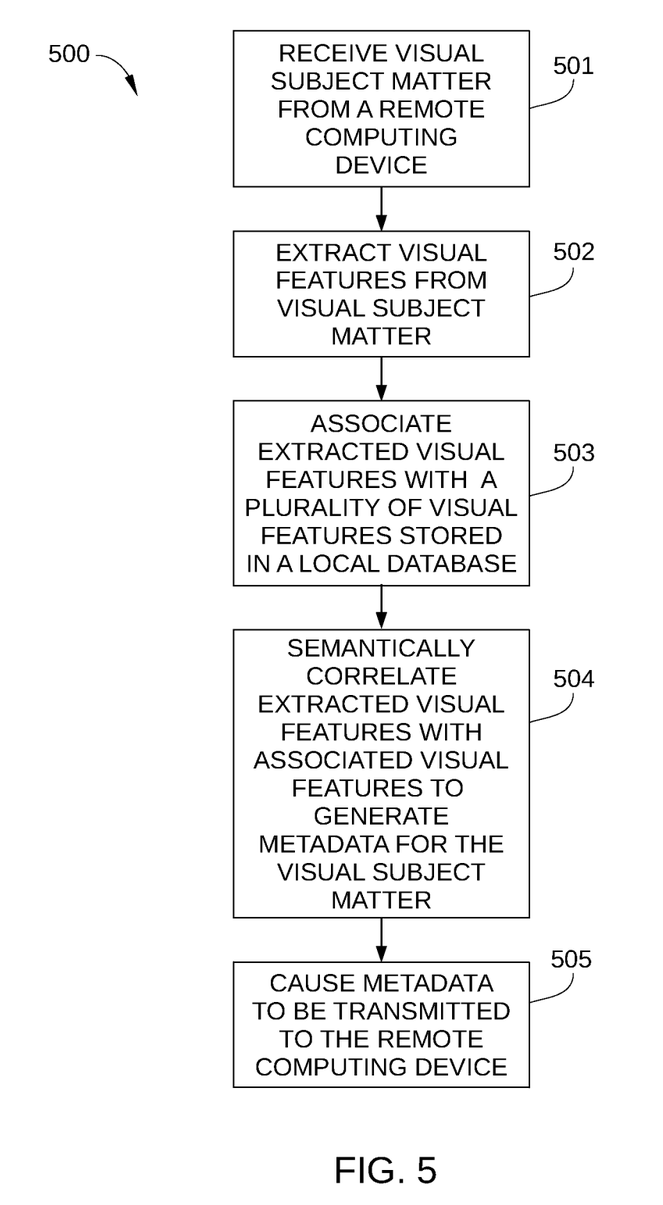
FIG. 5 is a flowchart of method steps for generating metadata for visual subject matter, according to one embodiment of the present invention.

FIG. 5 is a flowchart of method steps for generating metadata for visual subject matter, according to one embodiment of the present invention. Although the method steps are described in conjunction with the systems of FIGS. 1-2D and 3, persons skilled in the art will understand that any system configured to perform the method steps, in any order, is within the scope of the present invention.

Prior to beginning a method 500, server system 300 extracts visual features and associated metadata from a plurality of digital images and/or videos and stores the visual features and metadata locally. For example, the extracted visual features may be stored in features database 341, and the associated metadata may be stored in knowledge database 342. Server system 300 then performs semantic analysis on the extracted visual features to generate additional semantic correlation data for each such visual feature, and stores the generated semantic correlation data 343 in knowledge database 342.

As shown, the method 500 begins at step 501, where server system 300 receives visual subject matter from a remote computing device, such as image content 361 from computing device 100 via network 105.

In step 502, server system 300 extracts one or more visual features from image content 361 using image processing software 322.

In step 503, server system 300 associates the one or more visual features extracted in step 502 with a plurality of visual features stored in a local database, such as features database 341. For example, server system 300 may use visual correlation software 323 to perform this correlation process.

In step 504, server system 300 semantically correlates the one or more visual features extracted in step 502 with the plurality of visual features associated therewith, to generate metadata, e.g., semantic correlation data 363, for the one or more visual features extracted in step 502.

In step 505, server system 300 causes the metadata generated in step 504 to be transmitted to computing device 100.

In sum, embodiments of the present invention provide systems and methods for browsing through collections of visual subject matter by using selected visual features of currently displayed images as search criteria. Automatically generated semantic metadata that are associated with the selected visual features allow a gesture-based selection approach to provide input to a semantic-driven image selection algorithm. Because the user is not required to remember metadata associated with the item being sought, fast and accurate location of the item is facilitated even when the item is stored in a very large collection of visual subject matter.

Various embodiments of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method of selecting visual subject matter stored in a database, the method comprising:
   receiving first user input that indicates a first region of a first image that is stored in the database;
   based on metadata associated with the first image, determining a first visual feature within the first region;
   receiving second user input that indicates a second visual feature included in a second region of a second image that is stored in the database, wherein the second visual feature corresponds to a negative selection criterion; and
   based on metadata associated with other images stored in the database and the negative selection criterion, selecting a third image from the database that includes a third visual feature that correlates with the first visual feature and does not include the second visual feature;
   generating a morphed view of the third image that includes the third visual feature in a central position, wherein the central position is different from an actual position of the third visual feature within the third image; and
   causing the morphed view to be displayed responsive to the first user input,
   wherein the metadata associated with the first image and the metadata associated with the other images stored in the database include image correlation information received from a remote server device.

2. The method of claim 1, wherein the morphed view is displayed via a computing device that includes the database.

3. The method of claim 2, further comprising receiving third user input that indicates a third region of the third image.

4. The method of claim 3, further comprising:
   based on metadata associated with the third region of the third image, determining a fourth visual feature in the third region of the third image; and
   based on metadata associated with other images stored in the database, selecting a fourth image from the database that includes a fifth visual feature that correlates with the fourth visual feature.

5. The method of claim 4, wherein the fourth image includes a sixth visual feature that correlates with the first visual feature.

6. The method of claim 1, wherein the method further comprises:
based on metadata associated with the second region of the second image, determining a fourth visual feature in the second region of the second image; and
based on metadata associated with the first image, causing the first image to not be displayed when the first image includes a visual feature that correlates with the fourth visual feature.

7. The method of claim 1, wherein the metadata associated with the first image further includes semantic information associated with the first image.

8. The method of claim 1, further comprising, prior to receiving user input that indicates the first region of the first image, receiving the image correlation information from the remote server device.

9. The method of claim 1, wherein the metadata associated with the first image further includes position information associated with the first region of the first image.

10. The method of claim 1, wherein selecting the third image from the database that includes the third visual feature that correlates with the first visual feature is based on at least one of a visual size of the first visual feature and an orientation of the first visual feature.

11. The method of claim 1, wherein selecting the third image from the database that includes the third visual feature that correlates with the first visual feature is based on at least one of spectral information associated with the first visual feature and textural information associated with the first visual feature.

12. A computing device, comprising:
a processor; and
a memory that is coupled to the processor and includes instructions that, when executed, cause the processor to perform the steps of:
receiving first user input that indicates a first region of a first image that is stored in the database;
based on metadata associated with the first image, determining a first visual feature within the first region;
receiving second user input that indicates a second visual feature included in a second region of a second image that is stored in the database, wherein the second visual feature corresponds to a negative selection criterion; and
based on metadata associated with other images stored in the database and the negative selection criterion, selecting a third image from the database that includes a third visual feature that correlates with the first visual feature and does not include the second visual feature;
generating a morphed view of the third image that includes the third visual feature in a central position, wherein the central position is different from an actual position of the third visual feature within the third image; and
causing the morphed view to be displayed responsive to the first user input,
wherein the metadata associated with the first image and the metadata associated with the other images stored in the database include image correlation information received from a remote server device.

13. The computing device of claim 12, wherein the morphed view is displayed via a computing device that includes the database.

14. The computing device of claim 13, wherein the memory further includes instructions that, when executed, cause the processor to perform the step of receiving third user input that indicates a third region of the third image.

15. The computing device of claim 14, wherein the third user input includes information generated by at least one of a gesture on a touch-sensitive screen and a selection on a display device.

16. The computing device of claim 14, wherein the memory further includes instructions that, when executed, cause the processor to perform the steps of:
based on metadata associated with the third region of the third image, determining a fourth visual feature in the third region of the third image; and
based on metadata associated with other images stored in the database, selecting a fourth image from the database that includes a fifth visual feature that correlates with the fourth visual feature.

17. The computing device of claim 16, wherein the fourth image includes a sixth visual feature that correlates with the first visual feature.

18. The computing device of claim 12, wherein the memory further includes instructions that, when executed, cause the processor to perform the steps of:
based on metadata associated with the second region of the second image, determining a fourth visual feature in the second region of the second image; and
based on metadata associated with the first image, causing the first image to not be displayed when the first image includes a visual feature that correlates with the fourth visual feature.

19. The computing device of claim 12, wherein the metadata associated with the first image includes at least one of position information associated with the first region of the first image and semantic information associated with the first image.

20. The computing device of claim 12, wherein the memory further includes instructions that, when executed, cause the processor to perform the step of, prior to receiving user input that indicates the first region of the first image, receiving the image correlation information from the remote server device.

21. A non-transitory computer readable medium storing instructions that, when executed by a processor, cause the processor to perform the steps of:
receiving first user input that indicates a first region of a first image that is stored in the database;
based on metadata associated with the first image, determining a first visual feature within the first region;
receiving second user input that indicates a second visual feature included in a second region of a second image that is stored in the database, wherein the second visual feature corresponds to a negative selection criterion; and
based on metadata associated with other images stored in the database and the negative selection criterion, selecting a third image from the database that includes a third visual feature that correlates with the first visual feature and does not include the second visual feature;
generating a morphed view of the third image that includes the third visual feature in a central position, wherein the central position is different from an actual position of the third visual feature within the third image; and
causing the morphed view to be displayed responsive to the first user input,
wherein the metadata associated with the first image and the metadata associated with the other images stored in the database include image correlation information received from a remote server device.

\* \* \* \* \*